United States Patent [19]
Srinivasan et al.

[11] Patent Number: 5,656,119
[45] Date of Patent: Aug. 12, 1997

[54] THERMALLY APERTURED NONWOVEN PRODUCT AND PROCESS FOR MAKING SAME

[75] Inventors: Ramesh Srinivasan, Billerica; W. Andrew Coslett, Medfield; Leonardo B. Leon Guerrero, Franklin; Donald V. McCoombs, Medway, all of Mass.

[73] Assignee: International Paper Company, Purchase, N.Y.

[21] Appl. No.: 464,914

[22] Filed: Jun. 5, 1995

Related U.S. Application Data

[62] Division of Ser. No. 260,126, Jun. 15, 1994.

[51] Int. Cl.$^6$ .................... B32B 3/10; B32B 31/20
[52] U.S. Cl. .................. 156/290; 156/62.8; 156/309.6; 428/137
[58] Field of Search ............... 156/290, 306.6, 156/308.4, 309.6, 324, 311, 62.8; 428/137, 286, 287, 302

[56] References Cited

U.S. PATENT DOCUMENTS

| | | | |
|---|---|---|---|
| 3,221,738 | 12/1965 | Ekberg et al. | |
| 3,507,943 | 4/1970 | Such et al. | 264/103 |
| 3,542,634 | 11/1970 | Such et al. | |
| 3,575,764 | 4/1971 | McFarren | |
| 3,620,906 | 11/1971 | Hannes | 156/222 |
| 3,678,933 | 7/1972 | Moole | 428/336 |
| 3,695,967 | 10/1972 | Ross | 156/202 |
| 3,850,785 | 11/1974 | McQuade et al. | |
| 3,925,127 | 12/1975 | Yoshioka | |
| 4,184,902 | 1/1980 | Karami | 156/85 |
| 4,348,444 | 9/1982 | Craig | 156/290 |
| 4,355,066 | 10/1982 | Newman | 428/198 |
| 4,588,630 | 5/1986 | Shimalla | |
| 4,726,976 | 2/1988 | Karami et al. | 428/137 |
| 4,758,297 | 7/1988 | Calligarich | 156/251 |
| 4,780,352 | 10/1988 | Palumbo | 428/138 |
| 4,842,596 | 6/1989 | Kielpikowski et al. | |
| 5,364,681 | 11/1994 | Pate | 156/308.4 |

OTHER PUBLICATIONS

McGraw–Hill Dictionary of Scientific and Technical Terms, 3rd, Ed., (1984), p. 238.
Encyclopedia of Polymer Science and Engineering, vol. 7, p. 98 (©)1937.

Primary Examiner—Daniel Stemmer
Attorney, Agent, or Firm—Ostrager, Chong & Flaherty

[57] ABSTRACT

A process for producing an apertured nonwoven fabric combines one or two outer nonwoven layer(s) with a layer of polymeric material having a lower melting temperature and a property of shrinking when melted. Heat and pressure are applied through a calender roll such that the polymeric material becomes bonded to the fibers of the nonwoven layer(s) and simultaneously shrinks and takes back the fibers away from the calendering points, thereby generating apertures through the nonwoven fabric. Preferably, the fibers are polyethylene or polypropylene fibers, and the layer of polymeric material is a thin plastic film of polyethylene stretchwrap, elastomeric, or heat shrink material. One outer nonwoven layer may be combined with the plastic film layer to form a bi-laminate product, or two outer nonwoven layers may be combined with an intermediate plastic film to form a tri-laminate product. Low denier polypropylene/polyethylene bi-component fibers or a blend of higher and lower melting fibers may also be used. Apertured products can also be obtained with non-thermoplastic outer layers and an intermediate plastic film layer.

22 Claims, 4 Drawing Sheets

THERMALLY APERTURED NONWOVEN PRODUCT AND PROCESS FOR MAKING SAME

This is a divisional of copending application Ser. No. 08/260,126 filed Jun. 15, 1994.

FIELD OF THE INVENTION

This invention relates generally to apertured nonwoven fabrics and, particularly, to an apertured nonwoven topsheet product formed by a thermal aperturing process.

BACKGROUND ART

Apertured nonwoven fabrics are used in environments where it is desired to combine the properties of a fluid pervious outer layer for contact with the skin of a user with an absorbent layer having fluid absorption capacity. Such apertured nonwoven fabrics find use as a topsheet in diapers, sanitary napkins, and adult incontinence products, etc.

Traditionally, apertured nonwoven fabrics are formed by hydraulic processes such as hydroentangling a fibrous web with an apertured pattern or spunlacing, by mechanical processes such as perforating or punching a nonwoven fabric, or by thermo-mechanical processes such as hot pin perforation, embossed roll calender, etc. Hydraulic processes require rather costly equipment and complex processing operations. Mechanical or thermo-mechanical processes also require multiple processing steps, e.g., by first forming a bonded nonwoven fabric then perforating or aperturing the same.

Some thermo-mechanical processes, such as taught in U.S. Pat. Nos. 3,507,943 and 3,542,634, can bond and aperture a fibrous layer in one step by pressure fusing the fibers of the nonwoven layer between contact points of embossed rolls or land-groove rolls and at the same time forming apertures therethrough by melting with sufficient heat and pressure, shearing action, etc. However, a high amount of heat and pressure is required to produce well-formed through-holes in the nonwoven layer. Other processes, such as taught in U.S. Pat. No. 4,184,902 to Karami or U.S. Pat. No. 4,780,352 to Palumbo, form a topsheet in one processing step by perforating and/or spot bonding a fluid-pervious nonwoven layer with a plastic intermediate layer. However, the holes or aperture areas generated may not be of sufficient dimension or well-formed shape, and may require additional processing such as hot blowing or stretching to generate apertures of sufficient size and shape.

It is therefore a principal object of the present invention to produce an apertured nonwoven fabric through a one-step cost-effective process using a simplified technique for generating apertures of sufficient size and shape. It is a particular object that such process take advantage of a physical interaction between polymeric materials of different melting temperatures under application of heat and pressure from the calendering points of an calender roll to accomplish simultaneously bonding of the fibers and forming of apertures through the nonwoven fabric.

SUMMARY OF THE INVENTION

In accordance with the present invention, a process for producing an apertured nonwoven fabric comprises the steps of combining a nonwoven layer of fibers having a higher melting temperature and a polymeric material having a lower melting temperature and a property of shrinking under application of heat, and applying heat and pressure to the combination of the first-mentioned fibers and the other polymeric material through calendering points of a calender roll, such that the melted polymeric material becomes bonded to the first-mentioned fibers and simultaneously shrinks and takes back the first-mentioned fibers away from the calendering points, thereby generating apertures through the nonwoven fabric.

In the preferred process, the fibers of the nonwoven layer are carded olefinic fibers, preferably polyethylene or polypropylene fibers, and the layer of polymeric material is a thin plastic film of olefinic material, such as a polyethylene stretch-wrap, or elastomeric material, or heat shrink material. The apertured product can have anywhere from 1–50% open (apertured) area. The process can be utilized for apertured nonwoven fabrics having basis weights ranging anywhere from 10.0 to 90.0 grams/yd$^2$ (gsy). One outer nonwoven layer may be combined with the plastic film layer to form a bi-laminate product, or two outer nonwoven layers may be combined with an intermediate plastic film to form a tri-laminate product.

In one particular example, the fibers of the nonwoven layer(s) are polypropylene having a melting point of about 165° C., and the plastic film is a 16-gsy polyethylene stretch-wrap having a melting point of 125° C. Alternatively, low denier polypropylene/polyethylene bi-component fibers or a selected blend of low and high melting fibers may be used to obtain the same physical effect of shrinking and taking back the fibers to form apertures through the nonwoven fabric. A similar effect can be obtained when non-thermoplastic fibers in the outer layers are bonded to and pulled back by an intermediate plastic layer. The resulting products exhibit good bonding, suitable strength, and well-formed apertures.

Other objects, features and advantages of the present invention are described in detail below in conjunction with the drawings, as follows:

DETAILED DESCRIPTION OF THE INVENTION

In the present invention, a one-step bonding and aperturing process is used for manufacturing a thermally apertured nonwoven product using thermal bonding (heated calendering) technology. The apertured nonwoven product is produced by combining one or two nonwoven layer(s) of fibers with a layer of polymeric material having a lower melting temperature and a property of shrinking when melted, such that under the application of heat and pressure the polymeric material becomes bonded to the fiber layer(s) and shrinks and takes back the fibers to form apertures through the nonwoven fabric.

An example of the general process for forming thermally aperturing nonwoven fabric in accordance with the invention is illustrated in FIGS. 1a–1d using a plastic film as the layer of polymeric material. One or two outer nonwoven layers 10a, 10b and a thin plastic film 12 are fed in superposed relation through the nip of a pair of heated calender rolls 20a, 20b. The calender rolls have a plurality of calendering points or lands 22a, 22b which come together to apply heat and pressure to the superposed layers fed in between. The fibers of the nonwoven layers are made of a polymeric material. Preferably, they are olefinic fibers such as polyethylene or, most preferably, polypropylene. The plastic film 12 is made of a polymeric material that has a melting temperature lower than that of the olefinic fibers and a property of shrinking upon application of heat above its melting temperature. Films which can be used include olefinic, such as polyethylene stretch-wrap, elastomeric, or heat shrink films.

Figure 1B:
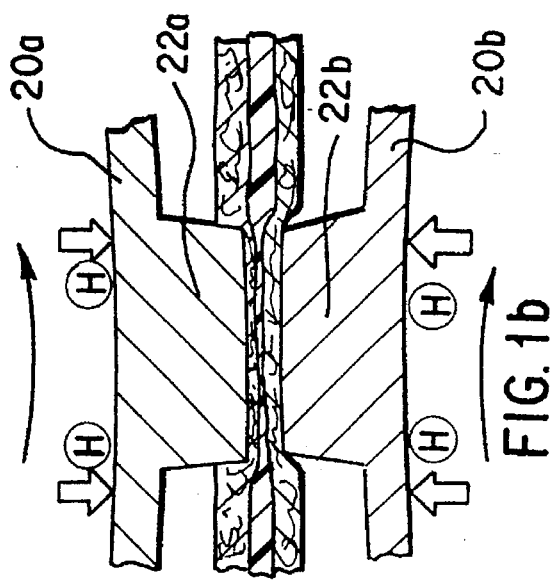
FIGS. 1a–1b illustrate the thermal aperturing technique in accordance with the invention for the general example of a tri-laminate product having outer nonwoven layers and an intermediate polymeric layer.
Figure 1D:
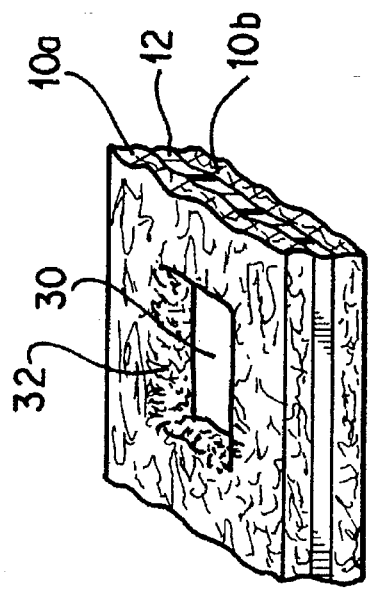
Figure 1A:
Figure 1C:
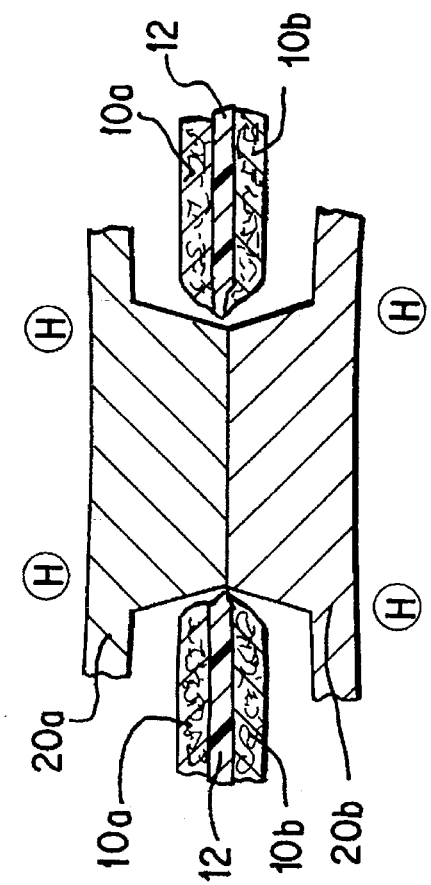

As shown in FIG. 1c, application of suitable heat and pressure causes the plastic film 12 to melt and shrink away from the area of the calendering points 20a, 20b. While shrinking back, the melting plastic film fuses to the fibers of the webs 10a, 10b and takes them back away from the calendering points. As shown in FIG. 1d, the result is that the plastic film 12 and the fibers of the webs 10a, 10b become fused to each other, forming a fused border 32 around the area of the calendering points which serves simultaneously to bond the layers together and to define an aperture 30 through the nonwoven fabric. The film acts as a carrier to create the aperture. On a per weight basis, some plastic films are cheaper than the fiber. Therefore, in some cases, the cost of making the apertured fabric is significantly less than making a conventional apertured fabric of comparable weight using fibers alone.

Figure 2:
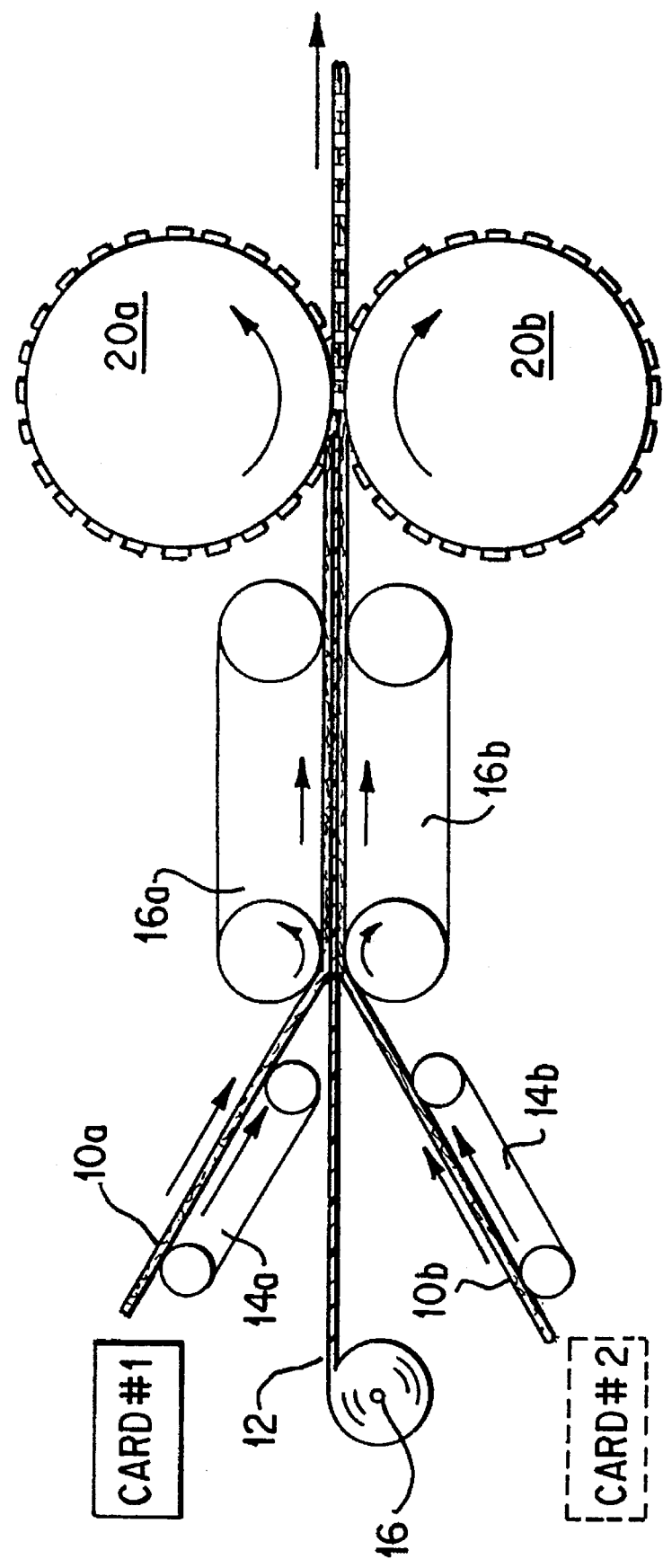
FIG. 2 is a schematic view of a process line for the manufacture of apertured nonwoven fabric.

In FIG. 2, a process line is shown schematically for the manufacture of apertured nonwoven fabric as a continuous roll product. The olefinic fibers are carded at card stations #1 and #2 and fed on card conveyors 14a, 14b, respectively, for the webs 10a, 10b of fibers. The thin plastic film 12 is unwound from an unwind stand 16 and fed in superposed relation between the two carded webs on the card conveyors, and the composite of plastic film enclosed between two carded webs is fed by conveyors 16a, 16b to hot calender rolls 20a, 20b to be thermally bonded and apertured. The preferred practice employs dual engraved rolls (Novonette #2 pattern), although anvil rolls or even a single engraved roll may also be utilized. On entering the heated calender rolls, the olefinic fibers is bonded together and the plastic film melts and shrinks away from the calendering points to generate a pattern of apertures. On exiting the calender rolls, the bonded and apertured nonwoven fabric is wound up on a roll.

The apertured product can be formed with typically 1–50% open (apertured) area. However, the product can be tailored with any required open area by modifying the calender bond pattern, process conditions, etc. While the apertures appear to the naked eye as ovals, they are in fact somewhat irregular in shape when observed under a microscope. The apertured product can also be mechanically tentered (stretched) as it exits in a hot condition from the calender. Tentering can significantly enhance the aperture clarity and size.

Depending on the kind of plastic film used and the type of fiber employed, the fluid handling properties of the apertured nonwoven product can be modified as required for suitable strike-through, re-wet, liquid distribution, and other properties. Comparison trials showed that apertured products can be formed having the strike-through and re-wet properties of a typical diaper topsheet.

The fabric can be formed to possess the desired softness for skin contact in various consumer disposable applications, as measured by hand-feel. However, a trade-off exists between fabric softness and the aperture clarity that is obtained. The elasticity of the apertured structure can be easily altered by using elastomeric materials instead of an olefinic film. Apertured products can be made in almost any weight, e.g., ranging from 10.0 to 90.0 gsy. A typical fabric for consumer disposable applications could be in the range of 35.0 to 55.0 gsy.

Different variations utilizing other types of plastic films and polymeric materials can produce apertured product using the same basic concept of the invention. Fibers other than olefinic fibers, for example polyesters, polyamides, etc., may be used for the nonwoven layer. Where a plastic film is used, apertured fabric can be made one-sided or two-sided. When the plastic film is embedded between two layers of fiber, a soft product having the same feel on both sides is made, referred to herein as a "tri-laminate" product. On the other hand, attaching the plastic film to either side of the fiber layer results in a product having a different feel on its two sides. One side feels soft due to the presence of fibers, while the other side feels like plastic. This is referred to as a "bi-laminate" product.

It is found that using polyethylene (PE) stretch-wrap as the thin film and embedding it between two layers of fiber gives a tri-laminate product with good aperture quality at the lowest cost. A desirable product can be made at anywhere from 30 to 46 gsy weights using low-elongation, high tenacity polypropylene (PP) fibers for the nonwoven layers, such as fibers designated T101 1.8 dpf×38 mm obtained from Hercules Corp., of Norcross, Ga., and 16 gsy clear stretch wrap film, such as Loadmaster-S, PC-3400, 1.0 mil, LDPE stretch wrap film, from Borden Packaging and Industrial Products, of North Andover, Mass.

The above-mentioned polypropylene fibers have a melting point of about 165° C. (330° F.), and the polyethylene stretch-wrap has a melting point of about 125° C. (260° F.). Optimum softness and hole clarity were obtained at calender roll temperatures of 320° F. in particular and 300° F. to 360° F. in general when using PP fibers, and at calender roll pressures in the range of 55 psi (pounds/sq. in.) or 300 pli (pounds/linear inch).

An apertured plastic film can be used in place of the stretch wrap film. For example, apertured polytheylene (PE) films of different grades, thicknesses, and compositions with or without ethylvinyl acetate (EVA) can be used. The apertured film embedded between two layers of fibers results in a tri-laminate product with very good aperture quality, particularly for apertured PE film with EVA. The product inherits the excellent fluid handling characteristics of the apertured film, e.g., good uni-directional passage of fluid. A bi-laminate variation can also be made.

Low denier polypropylene/polyethylene bi-component (PP/PE) fibers are also suitable for this thermal aperturing technique. The low melting polyethylene sheath in contrast to the higher melting polypropylene core acts similar to the thin olefinic film described above. In typical examples, cleanly apertured products were manufactured using Chisso ES 0.9 dpf×38 mm bi-component fibers obtained from the Chisso Company of Japan carded in two layers without any intermediate layer. Calender roll temperatures of 290° F. to 295° F. were found to work best with the PP/PE bi-component fibers.

A similar variation exploits the same physical effect by blending fibers with higher and lower melting points. The melting point differential is selected to simulate the effect of the thin olefinic film in taking back the fibers from the aperture areas. As an example, 20% of low melting polyethylene fiber can be blended with 80% polypropylene fibers to produce a suitable apertured product.

Elastic properties can be imparted to the apertured product by the use of an elastomeric film in place of the thin olefinic film. As an example, an elastomeric film such as one designated xExx56™ obtainable from Exxon Chemicals Corp., of Lake Zurich, Ill., can produce a product of good aperture clarity and excellent elastic properties in both the machine and cross directions. Both tri- and bi-laminate products can be made.

Heat shrink films may also be used to obtain the same physical effect of shrinking and taking back the fibers to form apertures through the nonwoven fabric. For example, low-melting high-shrink films obtained from Exxon Chemicals Corp. produced a product with good aperture quality. Another high shrink film, designated CLYSAR™, Grade #60LLP, from DuPont Corp., gave a unique, bulky, apertured fabric. Only tri-laminates are possible in this case because of the shrink film's reaction to a surface applying heat.

The above observations were made using a pilot thermal bonding line with 10" width. Scaling up to a 32" wide line tested successfully. Pilot line speeds of up to 150 feet/minute were run without any problems. The use of stretch wrap film and apertured PE film with EVA embedded in PP fiber layers produced very good aperture quality, particularly at 32 gsy fabric weight. Calender roll temperatures of between 328° to 332° F. and calender pressures of 400-550 pli on the 10" line and 250-300 pli on the wider thermal bonding line were found to provide optimum results. Good aperture quality was obtained with calender lolls having the Novonette pattern and land widths of 0.065" and 0.081", for percentage of apertured areas of 9% and 16%, respectively.

The thermal aperturing technique was also found to be adaptable to tri-laminate products having non-thermoplastic fibers, e.g., rayon for the nonwoven layers, and a suitable plastic film in between. Good apertured products were obtained using 15 gsy Hercules T101 PP fiber in one layer and 15 gsy rayon (1.5 dpf×40 mm) fibers in the other layer, with LDPE stretch wrap, apertured PE with EVA, and elastomeric styene block (SB) copolymer based films. A unique product having good to excellent aperture quality can be made with 15 gsy rayon fibers in both layers and an apertured PE with EVA or elastomeric SBR film in between. A product having excellent aperture quality can also be obtained with rayon fibers in both layers and a stretch wrap film in between if the calender roll temperature is increased substantially higher, e.g., 412° F. (instead of 320° F.). A product with excellent aperture quality can also be produced using the Hercules T101 PP fibers as the intermediate layer, but the resulting fabric has lower tensile strengths than when using plastic films.

Figure 3:
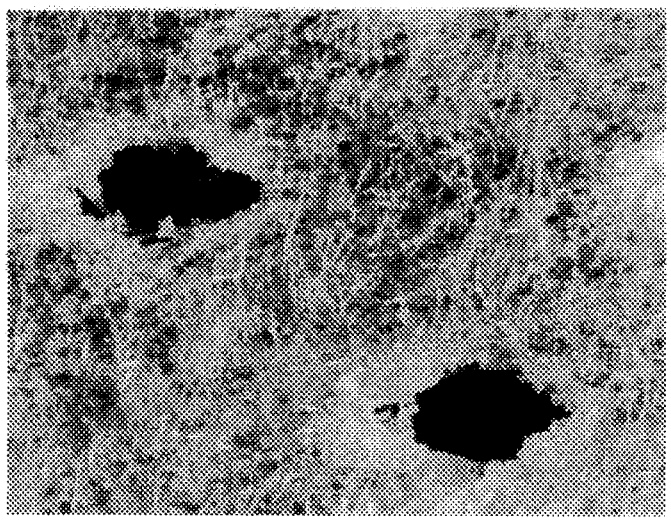
FIGS. 3–8 are photographic examples of apertured nonwoven products produced in accordance with the thermal aperturing technique.
Figure 4:
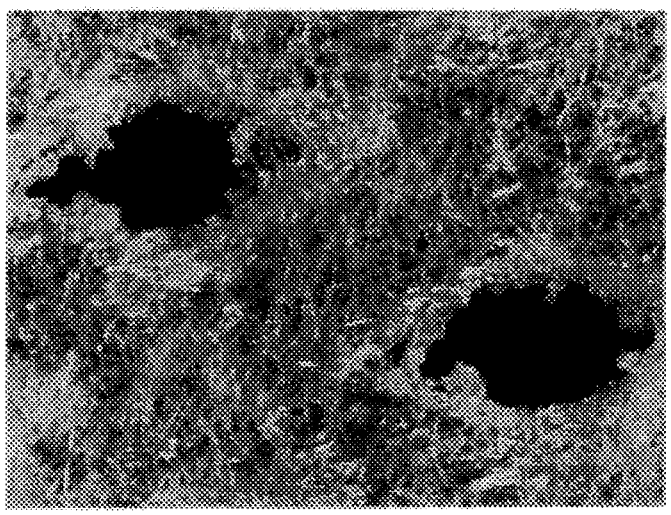
Figure 5:
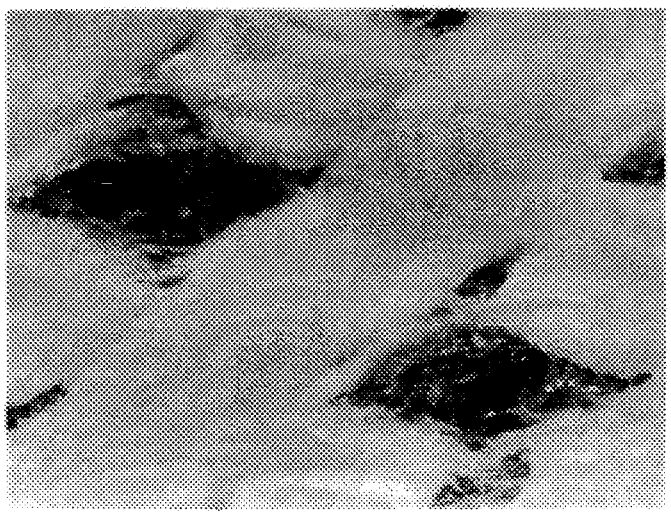
Figure 6:
Figure 7:
Figure 8:

Photographic examples of the apertured products described above show the aperture quality obtained with the thermal aperturing method of the present invention. FIG. 3 shows a tri-laminate product obtained with polypropylene outer layers and an intermediate thin film. FIG. 4 shows a tri-laminate product with PP/PP outer layers using calender rolls of a greater land width (16% apertured area). FIG. 5 shows a bi-laminate product obtained with one polypropylene outer layer and an elastomeric film. FIG. 6 shows an apertured product obtained with PP/PE bi-component fibers in two layers without any intermediate layer. FIG. 7 shows a tri-laminate product with PP and rayon outer layers and an apertured PE film in between. FIG. 8 shows a tri-laminate product obtained with both outer layers of rayon fibers and an apertured PE film in between. In each case, good aperture quality and shape are obtained by having the the lower melting, shrinking plastic material (thin film layer or bicomponent fiber) fusing to and pulling back the fibers of the outer layers. The fusing and taking back of the fibers by the melting/shrinking polymeric material is evident from the crusted ring of fused or congealed material surrounding the apertures and bonding the layers together.

Although the invention has been described with reference to certain preferred processes and examples, it will be appreciated that many other variations and modifications thereof may be devised in accordance with the principles disclosed herein. The invention and all such variations and modifications thereof within the scope and spirit of the invention are defined in the following claims.

We claim:

1. A process for producing an apertured nonwoven fabric comprising the steps of:
    combining a layer of carded fibers having a first melting temperature and a layer of polymeric material having a second melting temperature lower than said first melting temperature and a property of shrinking under application of heat, and
    applying heat and pressure to the combination of said carded fibers and said polymeric material through calendering points of a calender roll, such that said polymeric material becomes bonded to said carded fibers at said calendering points and simultaneously shrinks and pulls back said carded fibers away from said calendering points, thereby forming the nonwoven fabric and generating apertures having a fused border completely through the nonwoven fabric.

2. A process according to claim 1, wherein said carded fibers are olefinic fibers.

3. A process according to claim 2, wherein said carded fibers are polypropylene fibers.

4. A process according to claim 3, wherein said polypropylene fibers have a melting temperature of about 330° F.

5. A process according to claim 1, wherein said polymeric material is a plastic film of olefinic material.

6. A process according to claim 1, wherein said polymeric material is a plastic film of elastomeric material.

7. A process according to claim 1, wherein said polymeric material is a plastic film of heat shrink material.

8. A process according to any of claims 5-7, wherein said polymeric material is a polyethylene stretch wrap film.

9. A process according to any of claims 5-7, wherein said polymeric material is made from a resin comprising an elastomeric styrene block copolymer film.

10. A process according to any of claims 5-7, wherein said polymeric material is an apertured ethylene-vinyl acetate copolymer film.

11. A process according to claim 8, wherein said polyethylene film has a melting temperature of about 125° C.

12. A process according to claim 1, wherein the fabric is formed by combining two outer layers of said carded fibers and an intermediate layer of said polymeric material, wherein said polymeric material is a plastic film.

13. A process according to claim 12, wherein said carded fibers comprise olefinic fibers.

14. A process according to claim 12, wherein one of said two outer layers comprises olefinic fibers and another of said two outer layers comprises non-thermoplastic fibers.

15. A process according to claim 12, wherein said carded fibers in said two outer layers are non-thermoplastic fibers.

16. A process according to claim 15, wherein said non-thermoplastic fibers are rayon fibers.

17. A process according to claim 1, wherein the fabric is formed by combining one layer of said carded fibers and a layer of said polymeric material, wherein said polymeric material is a plastic film.

18. A process according to claim 1, wherein the fabric is formed with the layer of carded fibers and layer of polymeric material combined as a layer of bi-component fibers made of a lower-melting sheath and a higher-melting core.

19. A process according to claim 1, wherein the fabric is formed with the layer of carded fibers and layer of polymeric material combined as a blend of low and high melting fibers.

20. A process according to claim 1, wherein the calendering roll applies heat at a temperature in the range of 280° F. to 450° F.

21. A process according to claim 1, wherein the calendering roll applies pressure in the range of 200 to 600 pounds/linear-inch.

22. A process according to claim 1, wherein the apertured area is in the range of 9% to 16% of the fabric area.

* * * * *